United States Patent Office 2,889,295
Patented June 2, 1959

2,889,295

VINYL HALIDE POLYMERS STABILIZED WITH PHOSPHITES AND BENZOIC ACID ESTERS

Joseph R. Darby, Webster Groves, and Paul R. Graham, Richmond Heights, Mo., assignors to Monsanto Chemical Company, St. Louis, Mo., a corporation of Delaware No Drawing. Application July 16, 1956
Serial No. 597,870

16 Claims. (Cl. 260—23)

This invention relates to a novel light stabilizer mixture for halogen-containing resins.

In accordance with this invention it has been found that the light stability properties of halogen-containing resins are substantially improved by incorporating therein a mixture of a tri(hydrocarbon) phosphite and a hydroxy-benzoic acid ester of the structure

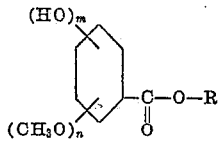

where $m$ is an integer from 1 to 2, where $n$ is an integer from 0 to 1, and where R is an aromatic radical. It is particularly preferred that $m$ be one, that $n$ be zero, and that R be an aromatic hydrocarbon radical, such as phenyl, methylphenyl, ethylphenyl, isopropylphenyl, naphthyl, biphenyl, and the like. It is to be understood, however, that R may contain oxygen atoms in addition to carbon and hydrogen atoms, e.g. R may be hydroxyphenyl, methoxyphenyl, dihydroxyphenyl, dimethoxyphenyl, hydroxymethoxyphenyl, etc.

This new and novel light stabilizer mixture has been found particularly useful in enhancing the light stability properties of the heat stable halogen-containing resins described in U.S. 2,671,064 which comprise a halogen-containing resin, a plasticizer therefor, a cadmium salt of an organic acid and an epoxy compound containing one or more groups of the structure

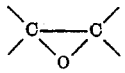

The following examples are illustrative of this invention but in no manner are to be construed as limitative thereof.

Compositions comprising, respectively,

| | A | B | C | D | E |
|---|---|---|---|---|---|
| Polyvinyl chloride | 100 | 100 | 100 | 100 | 100 |
| Di(2-ethylhexyl)phthalate | | | | 25 | 25 |
| Butyl benzyl phthalate | 50 | 50 | 50 | 25 | 25 |
| Butyl glycidyl phthalate | 3 | 3 | 3 | 3 | 3 |
| Cadmium dilaurate | 2 | 2 | 2 | 2 | 2 |
| Triphenyl phosphite | 1 | 1 | 1 | 1 | 1 |
| Phenyl salicylate | | 0.5 | 1 | | |
| m-Hydroxyphenyl salicylate | | | | 0.5 | |
| Benzyl salicylate | | | | | 2 | are prepared by mixing polyvinyl chloride with the respective ingredients in amounts set forth above on differential speed rolls at a roll temperature of 160° C. to form a homogeneous composition which is removed from the roll in the form of crude sheets. From the crude sheets there are molded finished sheets which are about 0.040 inch in thickness employing a molding cycle of three minutes at 160° C.

The light stability values set forth below are obtained after weatherometer exposure for 500, 750 and 1000 hours:

| Composition | 500 hours | 750 hours | 1,000 hours |
|---|---|---|---|
| A | Yellow | Many red specks | Dark red. |
| B | Colorless | Colorless | Colorless. |
| C | do | do | Do. |
| D | do | do | Do. |
| E | Yellow | Yellow | Yellow. |

Results similar to those obtained from compositions B, C and D are realized upon substituting cadmium diricinoleate, cadmium dibenzoate or cadmium phthalate, respectively, in substantially the same amount for cadmium dilaurate.

Compositions having similarly improved light stability properties are prepared by replacing the epoxy compound of compositions B, C and D, i.e. butyl, glycidyl phthalate, with substantially the same amount, respectively, of cyclohexyl-9,10-epoxyoctadecanoate, methyl-9,10-epoxy-octadecanoate, glycidyl laurate, 2-ethylhexyl glycidyl adipate, 1,2-epoxytetradecane and 1,2-epoxy-3-(2-naphthoxy) propane.

Employing in compositions B, C and D, respectively, instead of triphenyl phosphite an equal weight of tricresyl phosphite similarly improved light stability results are obtained. Similar results are obtained employing trioctyl phosphite and tri-nonyl phosphite.

Other salicylic acid esters than the aforedescribed may be employed in conjunction with a tri(hydrocarbon) phosphite of this invention and provide outstanding light stabilizing properties. As illustrative of such as p-tolyl salicylate, m-tolyl salicylate, 4-tert. butylphenyl salicylate, 2-hydroxyphenyl salicylate, 3-hydroxyphenyl salicylate, 4-hydroxyphenyl salicylate, 4-methoxyphenyl salicylate, 2,4-dihydroxyphenyl salicylate, 2-hydroxyphenyl 4-methoxy salicylate, 2-hydroxy-4-methoxyphenyl 4-methoxy salicylate, and the like. While salicylic acid esters are the preferred embodiment of this invention, other hydroxy benzoic acid esters when combined with a tri(hydrocarbon) phosphite of this invention provide light stabilizing properties. As illustrative of such are phenyl m-hydroxy-benzoate, phenyl p-hydroxy-benzoate, phenyl 3,4-dihydroxy-benzoate, phenyl vanillate, phenyl isovanillate, phenyl α-resorcylate, phenyl β-resorcylate, phenyl gentisate, and the like.

When a physical mixture of a tri(hydrocarbon) phosphite and a hydroxy benzoic acid ester of this invention is used as the light stabilizing substance for the heat stable compositions of U.S. 2,671,064, the amounts of the components may be varied considerably and still result in surprising improvements in light stability. For most purposes, however, 0.05 to 10 parts of the hydroxy benzoic acid esters of this invention and 0.1 to 5 parts of the tri(hydrocarbon) phosphite per 100 parts by weight of halogen-containing resins will provide satisfactory results.

The tri(hydrocarbon) phosphites used in the light stabilizer mixture are of the structure

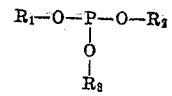

where $R_1$, $R_2$ and $R_3$ are like or unlike hydrocarbon radicals of a non-olefinic character containing from 4 to 14 carbon atoms. For example they may be aryl radicals such as phenyl, tolyl, ethylphenyl, xylyl, cumyl, cymyl, xenyl, naphthyl and the like, or alkyl radicals such as butyl, amyl, hexyl, octyl, decyl, dodecyl, or aralkyl radicals such as benzyl, phenethyl, phenpropyl, or any mixture of alkyl, aryl and alkaryl radicals. It is preferred that the hydrocarbon radical be an aryl, aralkyl or saturated alkyl radical containing from 6 to 12 carbon atoms. The phosphite should be non-volatile under the conditions of processing and be soluble in the halogen-containing resin. Specific examples of phosphite contemplated are triphenyl phosphite, tricresyl phosphite, phenyl dicresyl phosphite, cresyl diphenyl phosphite, tri(dimethylphenyl) phosphite, tributyl phosphite, trioctyl phosphite, trinonyl phosphite, tridecyl phosphite, tridodecyl phosphite, tribenzyl phosphite, octyldiphenyl phosphite, phenyl dioctyl phosphite, etc.

On substituting for the polyvinyl chloride used in the foregoing examples other halogen-containing resins, it is found that surprisingly effective light stabilization results are also obtained with such other resins, numerous examples of which are well known to those skilled in the art. Thus, for the polyvinyl chloride there may be substituted resins made from such vinylidene compounds as vinylidene chloride, vinyl chloracetate, chloro styrenes, chloro butadienes, etc. Such vinyl compounds may be polymerized singly or in a mixture with these or other halogen-containing vinylidene compounds or with vinylidene compounds free from halogen. Among the unsaturated materials free from halogen which may be copolymerized with halogen-containing vinylidene compounds are vinyl esters of carboxylic acids, for example vinyl acetate, vinyl propionate, vinyl butyrate, vinyl benzoate; esters of unsaturated acids, for example, alkyl acrylates, such as methyl acrylate, ethyl acrylate, propyl acrylate, butyl acrylate, allyl acrylate and the corresponding esters of methacrylic acid; vinyl aromatic compounds, for example, styrene, para-ethyl styrene, divinyl benzene, vinyl naphthalene, alpha-methyl styrene; dienes, such as butadiene, unsaturated amides, such as acrylic acid amide, acrylic acid aniline; unsaturated nitriles, such as acrylic acid nitrile; esters of α,β-unsaturated carboxylic acids, for example, the methyl, ethyl, propyl, butyl, amyl, hexyl, heptyl, octyl, allyl, methallyl, and phenyl esters of maleic, crotonic, itaconic, fumaric acids and the like. The class of copolymers in which a predominant portion, i.e., more than 50% by weight, of the copolymer is made from a halogen-containing vinylidene compound such as vinyl chloride represents a preferred class of polymers to be treated according to the invention.

Among the preferred embodiments of the invention is the stabilization of polymers prepared by the copolymerization of 95 to 80 parts by weight of a vinyl halide, e.g. vinyl chloride with 5 to 20 parts by weight of an α,β-unsaturated polycarboxylic acid such as diethyl maleate or other esters of maleic, fumaric, aconitic, itaconic acids, etc. Among the preferred esters of such acids are alkyl esters in which the alkyl group contains not over 8 carbon atoms.

The light stabilizer mixture of the invention is also effective when intimately mixed with halogen-containing resins in which part or all of the halogen is introduced into a preformed resin, e.g. chlorinated polyvinyl acetate, chlorinated polystyrene, chlorinated polyvinyl chloride, chlorinated natural and synthetic rubbers, rubber hydrochloride, etc.

The light stabilizer mixture of the invention is also effective in halogen-containing resins containing halogens other than chlorine, e.g., bromine, fluorine and iodine.

The halogen-containing resins may contain a varying proportion of halogen depending upon the nature of the resin and its contemplated use. However, as indicated above, vinyl chloride polymers in which the proportion of vinyl chloride units amount to 50% or more of the total monomer used in making the polymeric product represent a preferred class of polymers to be heat and light stabilized according to the invention.

Ordinarily as noted in U.S. 2,671,064 at least 1 part of the epoxy compound is used in stabilizing 100 parts of a halogen-containing resin for most uses and generally, at least 5 parts of the epoxy compound are preferred, although smaller amounts are effective to a considerable degree. Much larger amounts may be used, e.g. 50–100 parts, and serve to lengthen the useful life of the halogen-containing resins although not in direct proportion to the amount used. However, in some cases the epoxy compound may serve both as a plasticizer and an element of the stabilizer mixture and in such cases it may be worthwhile to incorporate such larger amounts.

The epoxy compounds used in conjunction with the light stabilizer mixture of this invention comprise organic compounds generally containing one or more

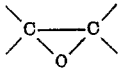

groups. Various substituted and unsubstituted aliphatic, aromatic, alicyclic and heterocyclic groups may be attached to said epoxy groups. Generally, however, the epoxy compounds which are employed should have a boiling point at atmospheric pressure of at least 150° C.; otherwise the stabilizing effect is likely to be relatively transitory due to evaporation of the epoxy compound and preferably the epoxy compounds should have a boiling point of at least 200° C. at atmospheric pressure. Illustrative examples of epoxy compounds which may be used according to the invention are 1,2-epoxytetradecane, 1,2-epoxyoctadecane and other derivatives of long chain alkanes, for example, alkanes having 10–24 carbon atoms having a

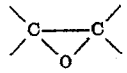

group; epoxy esters containing a long carbon chain such as glycidyl laurate, methyl 9,10-epoxyoctadecanoate, diethylene glycol, di-9,10-epoxyoctadecanoate, 9,10-epoxy octadecanyl acetate, 9,10-epoxyoctadecanyl octadecanoate, esters of polycarboxylic acids and alcohols containing a

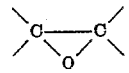

group such as di-2-ethylhexyl epoxy succinate, butyl glycidyl phthalate, diglycidyl phthalate, propylene glycol diglycidyl phthalate, diethylene glycol diglycidyl maleate, 2-ethylhexyl glycidyl adipate, hexyl glycidyl sebacate and other esters of these and other polycarboxylic acids containing at least a

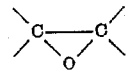

group and epoxidized acids and esters generally containing an unsaturated long chain aliphatic group such as epoxidized animal, vegetable or marine oils or the fatty acids or mixtures of fatty acids contained in such oils and esters thereof, e.g., epoxidized linseed oil, epoxidized soybean oil, epoxidized oleic acid, epoxidized tung oil, the methyl ester of epoxidized linseed oil fatty acids, etc.; glycidols such as glycidol, β-methyl glycidol, β-ethyl glycidol, β-hydroxy methyl glycidol, di-isobutenyl dioxide; epoxidized ethers such as alkyl glycidol ethers in which the alkyl group contains 1–5 carbon atoms, e.g., methyl, ethyl, propyl, butyl, amyl glycidyl ethers; glycidyl ethers containing unsaturated groups such as vinyl, allyl and methylallyl glycidyl ethers, phenyl glycidyl ether, tolyl glycidyl ethers, naphthyl glycidyl ethers, cyclopentyl glycidyl ether, cyclohexyl glycidyl ether, etc. Other illustrative epoxy compounds include cyclohexane oxide, 1-(2-phenylphenoxy) propylene oxide-2,3, 1-(2-phenylcyclohexanoxy) propylene oxide-2,3, 1-(cyclohexanoxy) propylene oxide-2,3, 1-(2-cyclohexyl-phenoxy) propylene oxide-2,3, 1-(4-tertiary butyl phenoxy) propylene oxide-2,3, styrene oxides such as styrene oxide, para-ethyl styrene oxide, dimethyl styrene oxide, ortho-methoxy styrene oxide, 4-(2,3-epoxypropoxy) acetyl phenone, the corresponding benzophenone epoxide, 4,4'-di(2,3-epoxypropoxy) benzophenone, mesityl oxide epoxide; epoxy alkyl and epoxy cycloalkyl amides such as 2-ethyl-3-propyl glycidamide, 2,3-di-propylglycidamide; aryloxyalkene oxides such as phenoxy propene oxide, para-tertiary amyl and para-secondary amyl phenoxy propene oxides.

According to one embodiment of the invention the epoxy compounds are epoxy ethers such as the glycidyl ethers of such polyhydric alcohols as glycerin, diglycerol, erythritol, pentaglycerol, pentaerythritol, mannitol, sorbitol, polyallyl alcohol, polyvinyl alcohol, ethylene glycol, propylene glycol, butylene glycol, etc.

One of the preferred classes of epoxy compounds comprises high molecular weight or resinous epoxy compounds, for example, those made by reacting polyhydric phenols with epichlorhydrin in various ratios in alkaline solution. Among the polyhydric phenols which may be used in preparing such glycidyl ethers are mono-nuclear phenols like resorcinol, catechol, hydroquinone, etc., or polynuclear phenols like bis-(4-hydroxyphenyl)-2,2-propane (bis-phenol), 4,4'-dihydroxy benzophenone, bis-(4-hydroxyphenyl) - 1,1 - ethane, bis - (4 - hydroxyphenyl)-1,1-ethane, bis-(4-hydroxyphenyl)-1,1-isobutane, bis-(4-hydroxyphenyl) - 2,2 - butane, bis - (4 - hydroxy - 2-methylphenyl)-2,2-propane, bis-(4-hydroxy-2-tertiary butyl phenyl) - 2,2 - propane, bis - (2 - dihydroxynaphthyl)-methane, 1,5-dihydroxy naphthalene, phloro glucinol, 1,4-dihydroxy naphthalene, 9,10-dihydroxy anthracene, 1,3,6-trihydroxy naphthalene, 4,4-dihydroxy diphenyl, 2,2-bis (4-hydroxy phenyl) propane and 1,4-bis (4-hydroxy phenyl) cyclohexane, etc. Such phenols may be reacted with epoxy chlorhydrin in the presence of an inorganic alkaline material to form the epoxy compounds, which, depending upon the conditions of the reaction, may be either monomeric or polymeric materials. Examples of such epoxy compounds include 1,4-diglycidol epoxy benzenes and 2,2-bis (4-glycidol oxyphenyl) propanes.

Other compounds containing a

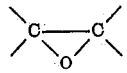

group which may be used in accordance with the invention include those made by reacting alkyl sulfonyl chlorides with glycidol in the presence of ammonia wherein the alkyl group contains up to 20 or more carbon atoms, e.g.

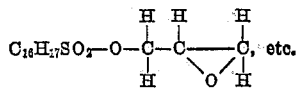

Usually the amount of the cadmium salt is smaller than that of the epoxy compound. While extremely small amounts of the cadmium salt have a noticeable effect on the heat stability, usually at least 0.1 part per 100 parts of halogen-containing resin is used and preferably at least 0.5 part. Generally, not over 5-10 parts of the cadmium salt are advantageously used although the use of more than 10 parts for each 100 parts of halogen-containing resin is not precluded. A preferred range is 0.5-5 parts of cadmium salt for each 100 parts of resin.

Various cadmium salts of organic acids may be used, examples of which include those salts made from such acids as saturated aliphatic acids, e.g. ethanoic, propanoic, butanoic, pentanoic, hexanoic, heptanoic, octanoic, nonanoic, decanoic, hendecanoic, dodecanoic, tetradecanoic, hexadecanoic and octadecanoic; mono-olefinic-unsaturated aliphatic acids such as propenoic acid, 2-butenoic acid, 2-methyl-2-propenoic acid, 3-butenoic acid, 2-pentenoic acid, 4-pentenoic acid, 2-methyl-2-butenoic acid, 2-hexenoic acid, 7-hexadecenoic acid, 10-undecenoic acid, 13-docosenoic acid, 2-hexenoic acid, and 9-octadecenoic acid; diolefinic unsaturated aliphatic acids such as 2,4-pentadienoic acid, 2,4-hexadienoic acid, 3,7-dimethyl-2,6-octadienoic acid, 9,12-octadecandienoic acid; triolefinic-unsaturated aliphatic acids such as 3,7-dimethyl-2,4,6-octatrienoic acid, 9,12,15-octadecatrienoic acid, 9,11,13-octadecatrienoic acid; substituted olefinic acids, for example, such hydroxy olefinic acids as 2-hydroxy-3-butenoic acid, 16-hydroxy-7-hexadecenoic acid and 12-hydroxy-9-octadecenoic acid; acetylenic unsaturated aliphatic acids such as propynoic, butynoic, pentynoic, amyl propynoic, 7-hexadecynoic, 9-octadecynoic and 13-docosynoic acids.

Mixtures of unsaturated aliphatic acids may be employed, as for example, mixtures of acids occurring in various oils, as for example, linseed, castor, tung, soya bean, perilla, corn, cotton seed, sunflower, safflower, sesame, poppy seed, walnut, peanut, olive, rape seed, whale and dehydrated castor oils. The acids derived from these oils consist predominantly of unsaturated acids containing 18 carbon atoms. For certain purposes, salts may be used which are made of the mixtures of acids occurring in oils such as palm kernel oil, cocoanut oil and the like, which mixtures of acids contain substantial amounts of unsaturated acids such as those mentioned above, but do not predominate therein.

Other cadmium salts of organic acids may also be used such as cadmium salts of aliphatic polycarboxylic acids, e.g., cadmium salts of maleic, succinic, adipic and sebacic acids, etc., as well as polycarboxylic acids obtained by polymerization of unsaturated fatty acids, e.g., oleic acid dimer and linoleic acid dimer; salts of aromatic acids, e.g. cadmium salts of phenylacetic, benzoic, phthalic and salicylic acids; salts of cyclic acids, e.g. the cadmium salt of abietic acid.

The cadmium salts may be either neutral or basic salts when monocarboxylic acids are used. Mixed salts made from mixtures of acids may also be used.

Of the various salts which may be used in the heat stabilizer combination, a preferred class comprises those made from ethylenically unsaturated fatty acids containing at least 10 carbon atoms, e.g. 10–24 carbon atoms, such as those mentioned above.

According to a further embodiment of the invention, the heat stabilizer may comprise a single compound containing cadmium and a

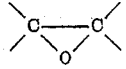

group, e.g. cadmium di-9,10-epoxy octadecanate and other cadmium salts of organic acids containing a

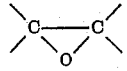

group such as those epoxy acids mentioned above.

The heat and light stabilizer combination of this invention is of particular importance in stabilizing halogen-containing resins especially vinyl chloride polymers plasticizer with phosphate esters such as the alkyl diaryl phosphates in which the alkyl group contains 6–14 carbon atoms and the aryl groups are phenyl or cresyl groups, i.e., ortho-, meta- or paracresyl groups and mixtures thereof since compositions containing such plasticizers have proved to be especially difficult to stabilize. Examples of such esters include 2-ethylhexyl diphenyl phosphate, 2-ethylhexyl dicresyl phosphate, 2-ethylhexyl phenyl cresyl phosphate, hexyl diphenyl phosphate, hexyl phenyl cresyl phosphate, hexyl dicresyl phosphate, dodecyl diphenyl phosphate, dodecylphenyl cresyl phosphate, dodecyl dicresyl phosphate, etc. Mixtures of such esters may frequently be used advantageously. The amount of the phosphate ester which is used may be substantially varied depending upon the particular ester and upon the particular use which is contemplated for the plasticized composition. Usually, however, from 10 to 100 parts of the esters are used for every 100 parts of vinyl chloride-containing resin.

As indicated by the examples, plasticizers other than alkyl diaryl phosphate esters may be employed as well as mixtures of such phosphate esters and such conventional plasticizers as dioctyl phthalate, tricresyl phosphate, butyl phthalyl butyl glycolate, etc. In the case of certain halogen-containing resins no plasticizers are required.

While this invention has been described with respect to certain embodiments, it is not so limited and it is to be understood that variations and modifications thereof may be made without departing from the spirit or scope of this invention.

What is claimed is:

1. A light stabilized vinyl halide polymer composition comprising a vinyl halide polymer in which at least 50% of the monomer units are vinyl halide units, any balance being units of an ethylenically unsaturated monomer, 0.1 to 5 parts per 100 parts by weight of polymer of a tri(hydrocarbon) phosphite of the structure

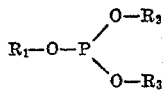

where $R_1$, $R_2$ and $R_3$ are hydrocarbon radicals free of olefinic unsaturation containing 4 to 14 carbon atoms and 0.05 to 10 parts per 100 parts by weight of polymer of a hydroxy substituted benzoic acid ester of the structure

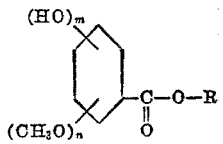

where $n$ is an integer of from 0 to 1, where $m$ is an integer of from 1 to 2, and where R is an aromatic radical consisting of carbon, hydrogen and oxygen atoms and whose cyclic nucleus is carbocyclic.

2. A light stabilized vinyl chloride polymer composition comprising a vinyl chloride polymer in which at least 50% of the monomer units are vinyl chloride units, any balance being units of an ethylenically unsaturated monomer, 0.1 to 5 parts per 100 parts by weight of polymer of a tri(hydrocarbon) phosphite of the structure

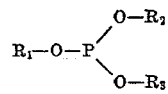

where $R_1$, $R_2$ and $R_3$ are hydrocarbon radicals free of olefinic unsaturation containing 4 to 14 carbon atoms and 0.05 to 10 parts per 100 parts by weight of polymer of a hydroxy substituted benzoic acid ester of the structure

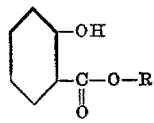

where R is an aromatic hydrocarbon radical.

3. A light stabilized vinyl chloride polymer composition comprising a vinyl chloride polymer in which at least 50% of the monomer units are vinyl chloride units, any balance being units of an ethylenically unsaturated monomer, 0.1 to 5 parts per 100 parts by weight of polymer of a tri(hydrocarbon) phosphite of the structure

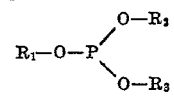

where $R_1$, $R_2$ and $R_3$ are hydrocarbon radicals free of olefinic unsaturation containing 6 to 12 carbon atoms and 0.05 to 10 parts per 100 parts by weight of polymer of m-hydroxyphenyl salicylate.

4. A composition resistant to the deteriorating effects of heat and light comprising a vinyl chloride polymer in which at least 50% of the monomer units are vinyl chloride units, any balance being units of an ethylenically unsaturated monomer and as a stabilizer therefor (a) in heat stabilizing amounts a mixture of a cadmium salt of a carboxylic acid and an epoxy compound characterized by the grouping

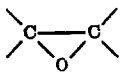

and (b) in light stabilizing amounts in the range of 0.1 to 5 parts per 100 parts by weight of polymer of a tri (hydrocarbon) phosphite of the structure

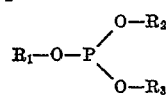

wherein $R_1$, $R_2$ and $R_3$ are selected from the group consisting of aryl, aralkyl and saturated alkyl radicals containing from 6 to 12 carbon atoms and 0.05 to 10 parts per 100 parts by weight of polymer of a hydroxy substituted benzoic acid ester of the structure

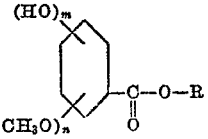

where $n$ is an integer of from 0 to 1, where $m$ is an integer of from 1 to 2, and where R is an aromatic radical consisting of carbon, hydrogen and oxygen atoms and whose cyclic nucleus is carbocyclic.

5. A composition resistant to the deteriorating effects of heat and light comprising a vinyl chloride polymer in which at least 50% of the monomer units are vinyl chloride units, any balance being units of an ethylenically unsaturated monomer and as a stabilizer therefor (a) in heat stabilizing amounts a mixture of a cadmium salt of a carboxylic acid and an epoxy compound characterized by the grouping

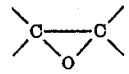

and (b) in light stabilizing amounts in the range of 0.1 to 5 parts per 100 parts by weight of polymer of a tri (hydrocarbon) phosphite of the structure

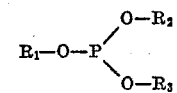

wherein $R_1$, $R_2$ and $R_3$ are hydrocarbon radicals free from olefinic unsaturation containing 6 to 12 carbon atoms and 0.05 to 10 parts per 100 parts by weight of polymer of a hydroxy substituted benzoic acid ester of the structure

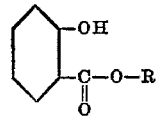

where R is an aromatic hydrocarbon radical.

6. A composition resistant to the deteriorating effects of heat and light comprising a vinyl chloride polymer in which at least 50% of the monomer units are vinyl chloride units, any balance being units of an ethylenically unsaturated monomer and as a stabilizer therefor (a) in heat stabilizing amounts a mixture of a cadmium salt of a carboxylic acid and an epoxy compound characterized by the grouping

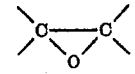

and (b) in light stabilizing amounts in the range of 0.1 to 5 parts per 100 parts by weight of polymer of a tri (hydrocarbon) phosphite of the structure

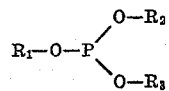

wherein $R_1$, $R_2$ and $R_3$ are hydrocarbon radicals free from olefinic unsaturation containing 6 to 12 carbon atoms and 0.05 to 10 parts per 100 parts by weight of polymer of metahydroxyphenyl salicylate.

7. The composition of claim 4 wherein the cadmium salt is the cadmium salt of an ethylenically unsaturated fatty acid containing at least 10 carbon atoms.

8. The composition of claim 7 wherein the halogen-containing resin is polyvinyl chloride.

9. The composition of claim 7 wherein the halogen-containing resin is a vinyl chloride-vinyl acetate copolymer.

10. The composition of claim 7 wherein the halogen-containing resin is a vinyl chloride-diethyl maleate copolymer.

11. The composition of claim 7 having as a plasticizer therefor a phosphate ester plasticizer, the said phosphate being present in amounts of 10 to 100 parts by weight per 100 parts of the vinyl chloride polymer.

12. The composition of claim 11 wherein the phosphate ester plasticizer is an alkyl diaryl phosphate wherein the alkyl group contains from 6 to 14 carbon atoms and the aryl group is a member of the class consisting of phenyl and cresyl radicals.

13. The composition of claim 12 wherein the tri(hydrocarbon) phosphite is triphenyl phosphite.

14. The composition of claim 13 wherein the cadmium salt is cadmium diricinoleate.

15. The composition of claim 13 wherein the cadmium salt is cadmium laurate.

16. A composition resistant to the deteriorating effects of ultraviolet light which comprises a vinyl halide polymer and in light stabilizing amounts a mixture of a tri(hydrocarbon) phosphite of the structure

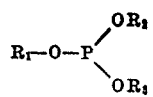

where $R_1$, $R_2$ and $R_3$ are hydrocarbon radicals free of olefinic unsaturation containing from 4 to 14 carbon atoms and a hydroxy substituted benzoic acid ester of the structure

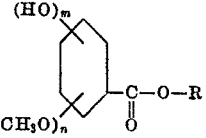

where $n$ is an integer of from 0 to 1, where $m$ is an integer of from 1 to 2, and R is an aromatic radical consisting of carbon, hydrogen and oxygen atoms and whose cyclic nucleus is carbocyclic.

References Cited in the file of this patent

UNITED STATES PATENTS

| | | |
|---|---|---|
| 2,464,250 | Moll et al. | Mar. 15, 1949 |
| 2,469,696 | Minsk et al. | May 10, 1949 |
| 2,477,609 | Irons et al. | Aug. 2, 1949 |
| 2,564,646 | Leistner et al. | Aug. 14, 1951 |
| 2,572,571 | Marling | Oct. 23, 1951 |
| 2,671,064 | Cowell et al. | Mar. 2, 1954 |
| 2,752,319 | Lipke et al. | June 26, 1956 |

OTHER REFERENCES

Schildknecht: Vinyl and Related Polymers, page 310, John Wiley, N.Y. (1952).